UNITED STATES PATENT OFFICE.

JOHN C. FLEMING, OF BOSTON, MASSACHUSETTS.

METHOD OF MAKING FOOD COMPOSITIONS.

1,213,854.                  Specification of Letters Patent.     Patented Jan. 30, 1917.

No Drawing.            Application filed November 14, 1916.   Serial No. 131,272.

*To all whom it may concern:*

Be it known that I, JOHN C. FLEMING, a citizen of the United States, residing at Boston, in the county of Suffolk and State of Massachusetts, have invented new and useful Improvements in Methods of Making Food Compositions, of which the following is a specification.

This invention is a food compound and a process for producing the same.

The object of the invention is to produce a food compound containing the nutritive and useful properties of peanuts, combined with a cereal product.

To produce the improved food compound referred to, the outer shells are removed from raw peanuts in any suitable manner, and likewise the inner shells with all impurities are removed by any process or means which will not injure the nuts. It is preferred to subject the nuts, after removal of the outer shells, to a cold aqueous solution of borax, which will remove the inner shell, without disturbing the oil or food value of the nut. After being subjected to the borax solution until the inner shells have been removed, the nuts are suitably separated from the shells and rinsed in cold water. The nuts are then placed within a closed receptacle and subjected to steam pressure while contained therein, until they are digested and disintegrated, and form a homogeneous mass similar to an emulsion. At this stage the oil may be removed if desired, although for some purposes it is desired to retain the oil. If the oil is to be removed, its removal may be effected by allowing the mass to stand until the solid matter is precipitated or settled, whereupon the oil may be drained off in any desired manner. After being subjected to the action of steam, as above described, the disintegrated nuts, either before or after separation of the oil, as the case may be, are converted into a dry product by being mixed with a cereal, or product therefrom, malt being preferred.

In practice the compound above described may be used similarly to the well known "peanut butter," or it may be dried in suitable manner, in which condition it may be employed as a base for confectionery, or it may be used as a beverage by mixing with any suitable liquid.

I claim as my invention—

1. A method of producing a food compound comprising subjecting shelled peanuts while in a closed receptacle to the action of steam under pressure until disintegrated into an emulsion-like mass, and then mixing the same with a cereal.

2. A method of producing a food compound comprising subjecting shelled peanuts to the action of steam under pressure until disintegrated, removing the oil, and then mixing with a cereal.

3. A method of producing a food compound comprising subjecting shelled peanuts to the action of steam under pressure until disintegrated, mixing the same with a cereal, and finally drying.

4. A method of producing a food compound comprising removing the outer shells from peanuts, subjecting the shelled peanuts to the action of a cold borax solution to remove the inner shells, then subjecting them to the action of steam under pressure until disintegrated, and finally mixing with a cereal.

5. A method of producing a food compound comprising removing the outer shells from peanuts, subjecting the shelled peanuts to the action of a cold borax solution to remove the inner shells, then subjecting them to the action of steam under pressure until disintegrated, mixing the disintegrated mass with a cereal, and finally drying.

In testimony whereof I have hereunto set my hand.

JOHN C. FLEMING.